(12) United States Patent
Berberich et al.

(10) Patent No.: US 6,575,782 B2
(45) Date of Patent: *Jun. 10, 2003

(54) MODULAR CENTRAL ELECTRICAL UNIT FOR MOTOR VEHICLES

(75) Inventors: Reinhold Berberich, Frankfurt am Main (DE); Norbert Fleischhauer, Eschborn (DE)

(73) Assignee: Mannesmann VDO AG, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/506,524

(22) Filed: Feb. 17, 2000

(65) Prior Publication Data

US 2002/0009927 A1 Jan. 24, 2002

(30) Foreign Application Priority Data

Feb. 18, 1999 (DE) .......................................... 199 06 784
Jan. 7, 2000 (DE) .......................................... 100 00 336

(51) Int. Cl.⁷ .............................................. H01R 13/60
(52) U.S. Cl. ........................ 439/535; 439/76.1; 439/34
(58) Field of Search ........................ 439/34, 76.2, 535, 439/76.1, 283–295

(56) References Cited

U.S. PATENT DOCUMENTS 5,397,929 A * 3/1995 Hogarth et al. ............. 307/140

* cited by examiner

Primary Examiner—P. Austin Bradley
Assistant Examiner—Truc Nguyen
(74) Attorney, Agent, or Firm—Martin A. Farber

(57) ABSTRACT

A modular central electrical unit for motor vehicles, comprising an electrically insulating base body (1) having plug locations (3, 4), which are formed on the outer wall of the base body (1), for accommodating an electrical and an electromechanical functional unit, which plug locations are connected to one another and to a cable harness (10) and/or an electronic functional unit (11, 12, 13, 14, 15, 25). In a central electrical unit, which can be upgraded and/or modified without any additional space requirement, an electrical connection (5) which passes out of the base body (1) is such that it overhangs the base body (1), and a base body segment (8), which is formed from a plug body of a vehicle component (10) that is to be connected and is composed of insulating material, is mechanically attached to the base body (1), with the base body segment (8) and/or the fitted functional unit (14, 15, 25) being electrically connected to the electrical connection (5).

17 Claims, 4 Drawing Sheets

MODULAR CENTRAL ELECTRICAL UNIT FOR MOTOR VEHICLES

FIELD AND BACKGROUND OF THE INVENTION

The invention relates to a modular central electrical unit for motor vehicles, comprising an electrically insulating base body having plug locations, which are formed on the outer wall of the base body, for accommodating an electrical and an electromechanical functional unit, which plug locations are connected to one another and to a cable harness and/or an electronic functional unit.

The relays and/or plugs and fuses required for a specific vehicle equipment level are combined in a central electrical unit. Separate cable harnesses lead from here to various controllers, switches and actuators.

Such a central electrical unit essentially carries out a distributor function, in order to supply electrical voltage to the electrical loads in the motor vehicle, such as the windshield wipers or flashers, via electrical cables or cable harnesses, and to monitor the serviceability of the loads. The electrical loads are in this case actuated via relays, which are arranged together with the fuses for the load circuits, plugged in the top face of the central electrical unit.

DE 42 27 182 C1 discloses a central electrical unit in which a basic body is formed from a plurality of partial base bodies, with the partial base bodies being electrically connected to one another via a relay. This has the disadvantage that the central electronics unit cannot be disassembled until the plugs and relays have been removed. Furthermore, cable-harness plugs cannot be plugged on and made contact with individually until the central electronics unit has been fitted.

All the plug lots (possibly as well as contacts) which may be required for the maximum equipment level must be reserved during the production of the central electrical unit. Variants which go beyond the scope, once it has been defined, or changes to individual plug-in locations can be provided only by redesign and replacement of the complete relay base, and this is feasible only with major effort.

SUMMARY OF THE INVENTION

The invention is thus based on the object of specifying a central electrical unit which can be expanded and/or modified without any additional space requirement.

According to the invention, the object is achieved in that an electrical connection which passes out of the base body, or base module, is such that it overhangs the base body, and a base body segment, or auxiliary module, which is formed from a plug-in body of a vehicle component that is to be connected, is mechanically attached to the base body, as a modular construction, with the base body segment and/or the fitted functional unit being electrically connected to the electrical connection.

The advantage of the invention is that, while retaining a single basic body or module which is used for standard vehicle functions, a specific number of design variants can be reserved from any desired number of options, without having to define this completely even before vehicle introduction. In this case, there is no need to reserve the physical space for all possible variants, some of which are mutually exclusive. The plug-in locations for reception of the vehicle components to be connected are such that the vehicle components can be fitted as partial segments, namely, the auxiliary modules, to the base module, there being additional plug-in locations for additional electronics.

In one refinement, on its surface, the base body segment has plug-in locations for a relay and/or a fuse and/or a mating connector for an electronic functional unit.

In a development of the invention, the base body segment is formed from the plug body of a cable-harness plug.

In this case, the plug bodies form autonomous partial segments, which are latched to the base body when fitted, and enlarge it piece by piece. Both individual components such as relays or fuses as well as complete controllers (for example a central electronics unit) can be plugged individually and directly onto these flexibly expandable building blocks, without any additional wiring.

The electrical connection is advantageously a distribution rail which is fitted with supply voltage lines and to which all the additional base body segments can be electrically connected. The electrical, electronic and/or electromechanical functional units which are connected to the base body segments can easily make contact with the distribution rail with the aid of electrical means arranged on the base body segment.

In addition to the lines for the supply voltage, bus lines for networking the individual components with one another and for networking the individual components with external devices are also advantageously formed on the distribution rail. Such a rail with supply and communication lines is used not only for networking but also to further reduce the wiring complexity.

The distribution rail can be produced particularly easily if it is in the form of a sheet-metal stamping.

In one refinement, the base body segments can be made contact with on both sides of the distribution rail.

In one refinement, the distribution rail overhangs the base body centrally, with base body segments being mechanically attached to the base body on both sides of the distribution rail, and with the cable harnesses of said base body segments being connected to various external electrical or electronic devices.

A second base body segment is advantageously attached to the first base body segment, and makes electrical contact with the distribution rail. The base body segments are in this case self-supporting.

A more robust arrangement is achieved if a frame for accommodating a base body segment is arranged on the base body and encloses the distribution rail, which passes out of the base body. The frame in this case forms an expansion area, which can be used as required, for various assemblies.

The base body and the frame are advantageously formed integrally. This is easy to achieve using a plastic injection-molding method.

The robustness can be further improved if a functional unit makes contact with the base body and a partial body segment or two partial body segments, engaging around them.

BRIEF DESCRIPTION OF THE DRAWINGS

The invention allows numerous configurations, one of which will be explained in more detail with reference to the figures illustrated in the drawings, in which.

DETAILED DESCRIPTION OF THE PREFERRED EMBODIMENT

Figure 1:
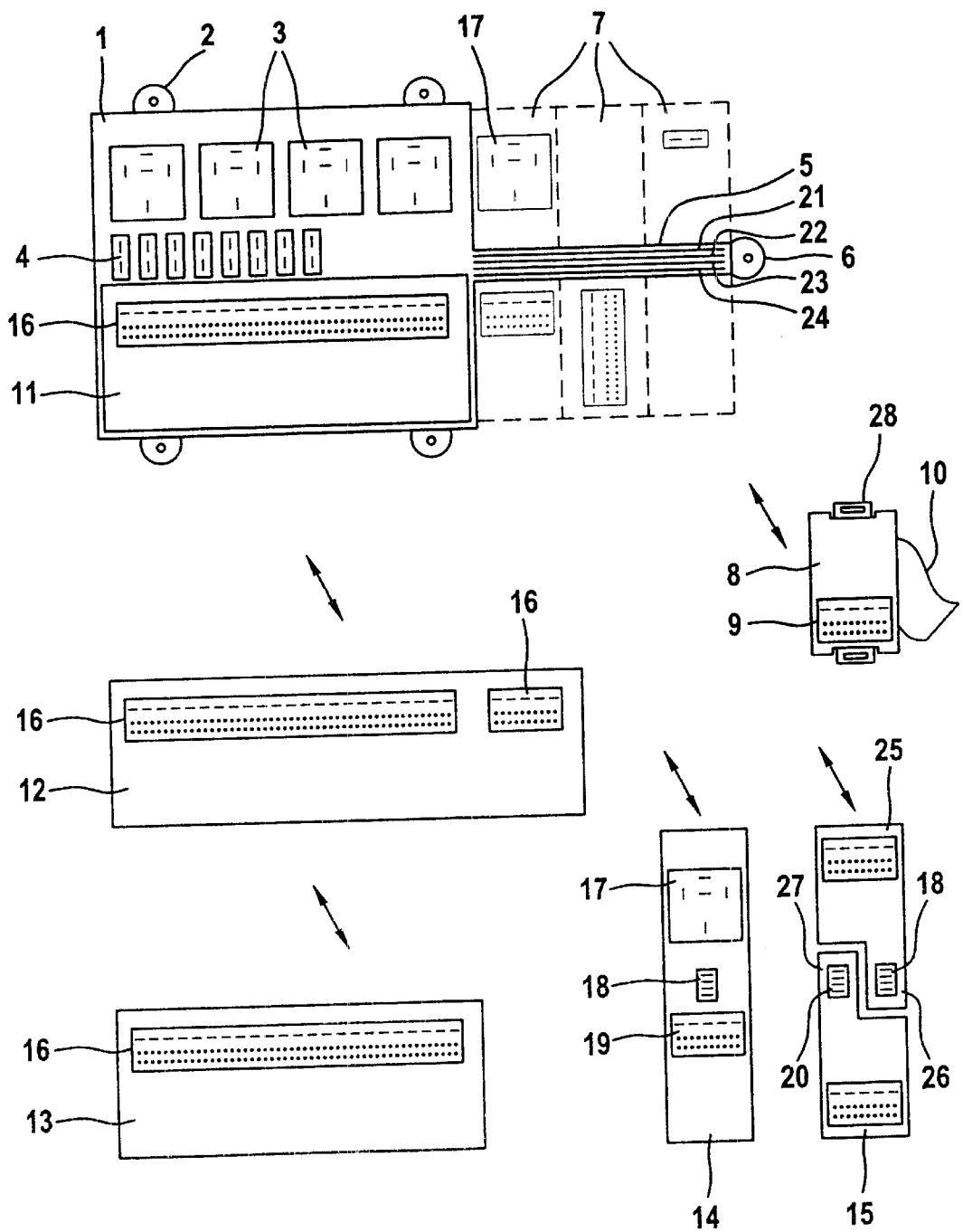
FIG. 1 shows a first device according to the invention.

FIG. 1 shows a central electrical unit of modular construction, having a base body, or module 1 for minimal functions of such a central electrical unit, a CAN bus and supply-voltage distribution rail 5, as well as an expansion area 7, which can be used as required, formed appropriately designed cable-harness plug receptacles of various functional assemblies.

The plastic basic body, or module 1 is connected to the motor vehicle via screw connections, of which only the screw holder 2 is shown. Conductor tracks, which are not shown in any more detail, are arranged in the base body 1. Plug-in locations 3 for relays and plug-in locations 4 for fuses are formed on the surface of the basic body 1. The distribution rail 5 passes out of the basic body 1, with those lines which are arranged on the distribution rail 5 being connected in the interior of the basic body 1 to the conductor tracks which are arranged inside the basic body 1.

The conductor tracks 21, 22 which are arranged on the distribution rail 5 represent the connection for the terminal 30 and the terminal 31, respectively, of the motor vehicle. Furthermore, communication lines 23 and 24 are provided for the motor vehicle CAN bus (low and high). The distribution rail 5 is mechanically screwed to the motor vehicle at its free end 6.

The possible expansion area 7 for the basic body 1 is represented by dashed areas. In the present case, the expansion area 7 can be formed by six partial body segments (auxiliary modules 8, with each partial body segment 8 being formed from a plug receptacle of a cable harness 10. The plug receptacle 9 is in this case designed such that its plug body, which has plug-in contacts forms a base plate which can be mechanically connectedr for example by means of latching clips 28, which are arranged on the outside of the base body segment 8 and on the outside of the basic body 1, facing this body 8 during fitting.

In order to make electrical contact between the partial body segment 8 and the distribution rail 5, the partial body segment 8 has, on the side facing the distribution rail 5, a contact-making device, which is not shown in any more detail and is pushed over the distribution rail 5, thus making the electrical connection between the partial body segment 8 and the BUS rail 5.

A plurality of such cable-harness segments 8 can advantageously be arranged in the present refinement, with the distribution rail 5 projecting out of the basic body 1 centrally, as a result of which three bodies 8 can be arranged on each of the two sides of the distribution rail 5.

A central electronics unit can now be plugged in any desired way onto this body assembled in this way and comprising the basic body 1 and the additional segments 8. The central electronics unit 11 is, for example, in this case of such a size that it covers only the basic body 1. In another version, the central electronics unit 12 shown in the figure is simultaneously plugged into the base plate 1 and into the partial body segment 8 adjacent to the basic body 1. The central electronics units 11, 12 and 13 in this case have plug-in connections 16, via which they drive actuating devices, such as the motor and mechanical items of a windshield wiper or of a seat adjuster.

The plug-on elements 14, 15, 25 are examples of a refinement for expansion electronics, which are likewise plugged onto the partial segments 8. The electronics expansion is possible by plugging an additional electronics unit 14 onto plug bodies 8, one of which is arranged above and another below the distribution rail 5, which additional electronics unit 14 has a plug connection for a relay 17, a contact device 18 and a plug-in device 19 for connection to a control unit, which is not shown in any more detail. The expansion element 14 in this case makes electrical contact with the BUS rail 5 from above, with the aid of the contact device 18.

Tabs 26, 27 are formed on the elements 15 and 25 in order to make contact with the bus rail 5, and are located opposite one another, with mirror-image symmetry, with respect to an imaginary line at right angles to the distribution rail 5. A contact device 18 or 20, respectively, is arranged in the tabs 26, 27 and makes contact with the BUS rail 5 when the expansion electronics 15 and 25 are being attached to the partial body segments 8. In this case, electrical contact is made with the supply lines 21 and 22 and the communication lines 23 and 24 via contact pins which are designed to be rigid.

Figure 2:
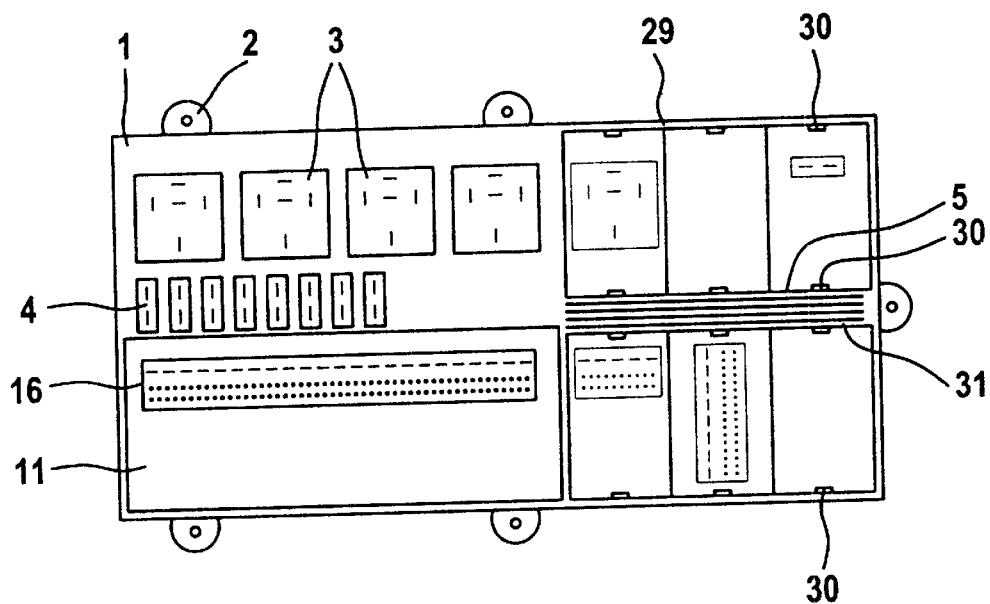
FIG. 2 shows a second device according to the invention.
Figure 3:
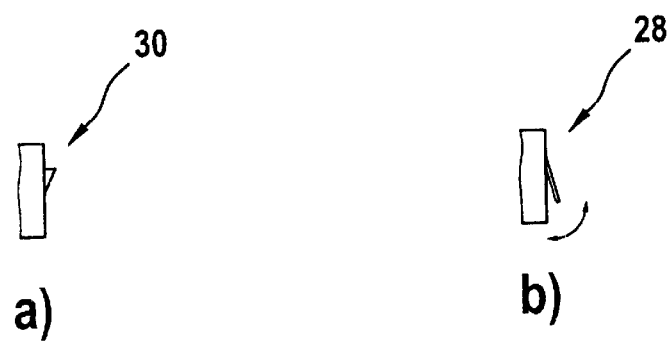
FIG. 3 shows latching devices.
Figure 4:
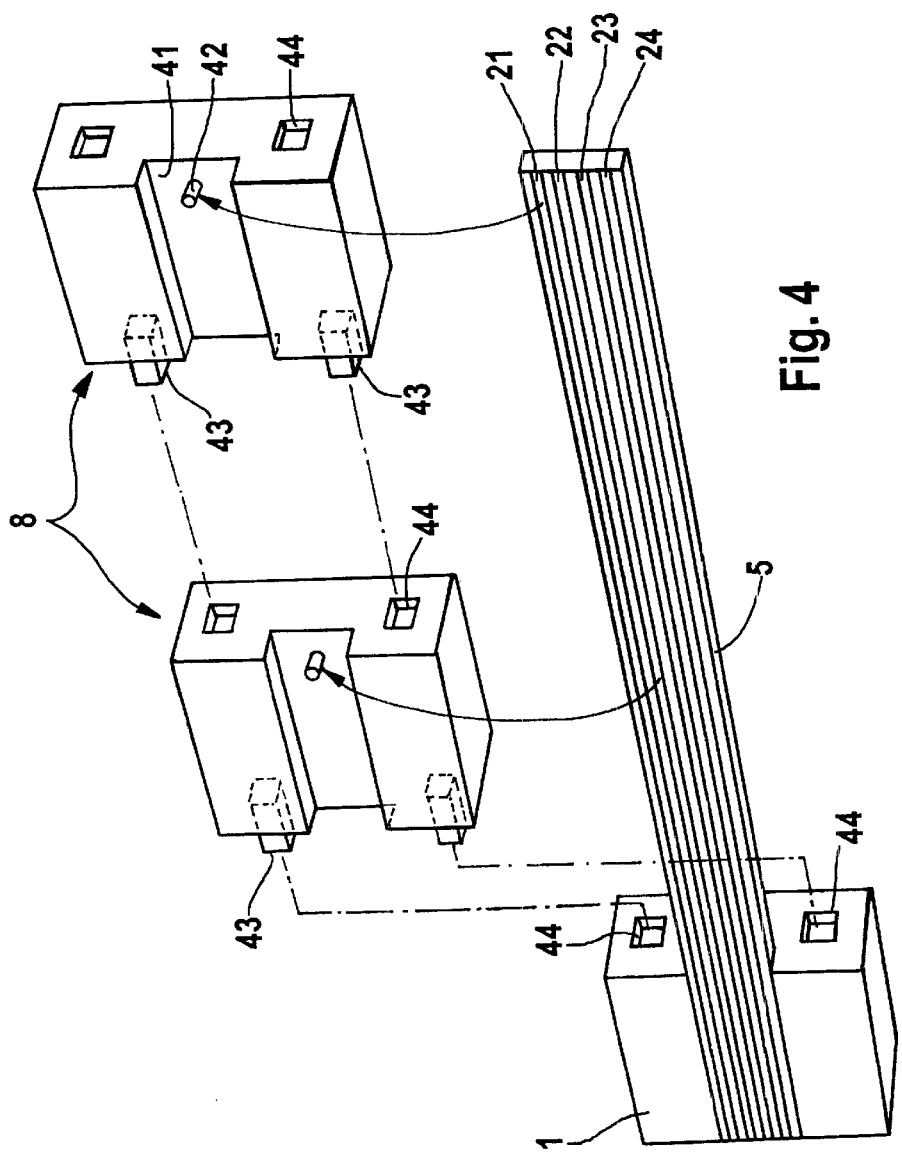
FIG. 4 shows diagrammatically an exploded view of a central electrical unit of the invention.

FIG. 2 shows a further version of the central electrical unit according to the invention. In this case, at the side, the basic body 1 has a frame 29, whose dimensions on the one hand correspond to the adjacent side of the basic body 1, and on the other hand are only insignificantly larger than the extent of the six partial body segments 8 described in FIG. 1. The basic body 1 and the frame 29 are advantageously produced integrally, from plastic. On its inner surfaces facing the distribution rail 5, the frame has latching tabs 30, in which the partial body segments 8 are secured with the aid of the latching clips 28 attached to them (FIG. 3). Some of the latching tabs 30 are attached to a plastic web 31, to which the distribution rail 5 is fitted or on which the supply lines 21, 22 and the communication lines 23, 24 are fitted directly. In this case, one or more partial body segments 8 may be attached to the frame, as required.

Figure 5:
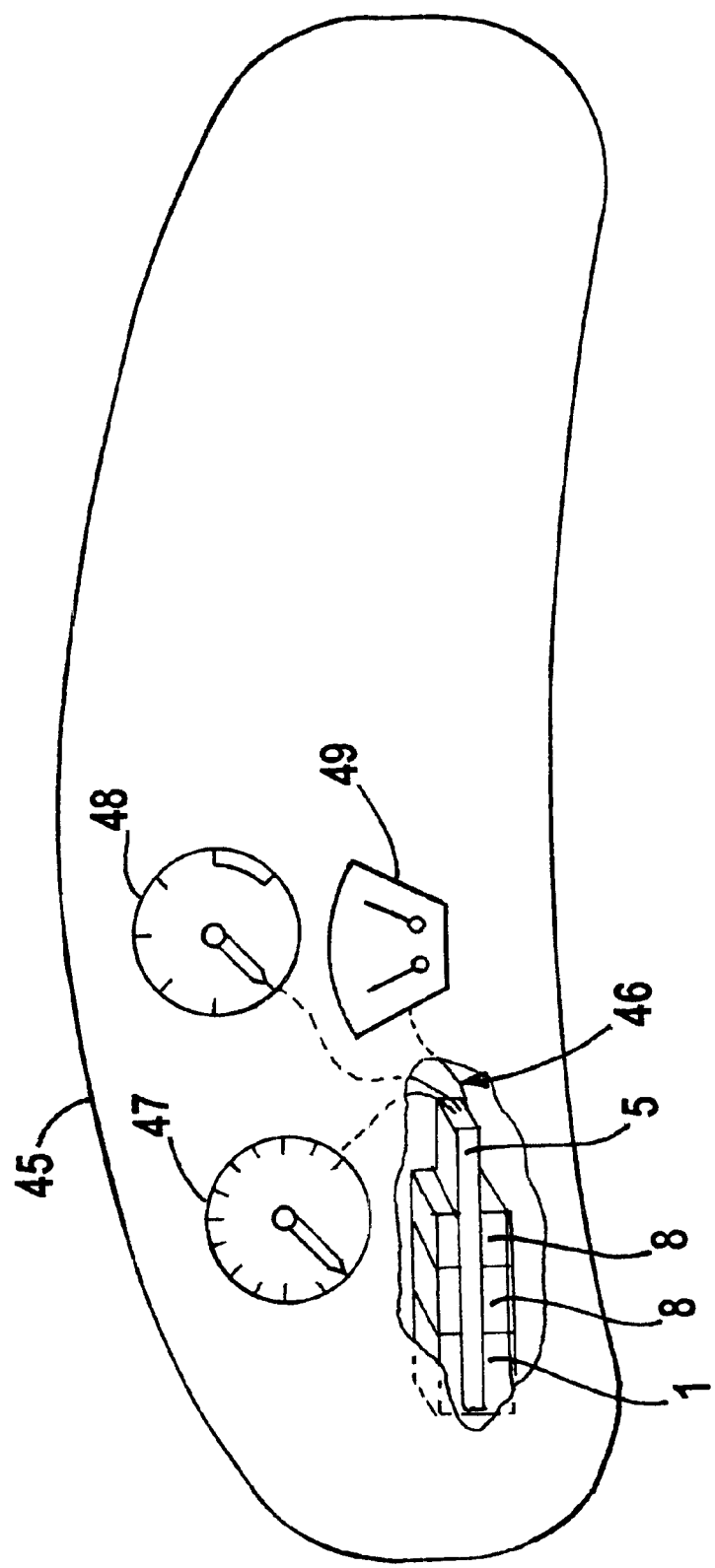
FIG. 5 shows placement of the central electrical unit behind the dash panel of a motor vehicle.

The exploded view of FIG. 5 shows emplacement of the partial body segments (auxiliary modules) 8 alongside the base body (base module) 1 of the central electrical unit. Each of the auxiliary modules 8 is configured for mating with the extension of the distribution rail 5 from the base module 1. By way of example, such mating configuration is depicted as a channel 41 which receives the rail 5. Various ones of the electrical conductors of the rail 5, such as the conductors 21, 22, 23 and 24, are connected electrically to respective ones of the auxiliary modules 8 by means of electrical contacts 42 located in the channels 41 of the auxiliary modules 8. To simplify the drawing, only one contact 42 is shown for each of the auxiliary modules 8. The configuration of the modules 1 and 8 permits a mounting of one module to the next module, such configuration being shown, by way of example, as an arrangement of pin 43 and socket 44 wherein pins 43 of an auxiliary module 8 can engage with sockets 44 of another auxiliary module 8 or of the base module 1. This results in a modular construction which facilitates mounting of the central electrical unit on the back side of a dash panel 45 of a motor vehicle, as depicted in FIG. 5. A portion of the dash panel 45 is cut away to facilitate a viewing of the modules 1 and 8 of the central electrical unit. Also indicated diagrammatically in FIG. 5 are electrical connections 46 from the conductors of the distribution rail 5 to various gauges 47, 48 and 49 on the dash panel 45. In FIG. 5, the steering wheel of the vehicle has been omitted to clarify the view of the dash panel 45.

We claim:

1. A modular central electrical unit for motor vehicles, comprising:

an electrically insulating base module having electrical plug-in locations formed on an outer wall of the base module for receiving an electrical and/or an electromechanical functional unit;

an electrical cable comprising a voltage distribution rail (5) which extends from the base module (1), the electrical plug-in locations being connected to one another and to the electrical cable and/or an electrical functional unit received by a plug-in location;

at least one of a plurality of auxiliary modules each of which provides an electrical and/or an electromechanical function, each of the auxiliary modules comprising a housing of insulating material, the housing having a mechanical mating face and an electrical mating face;

wherein one of the auxiliary modules is mechanically attached directly or via second of the auxiliary modules to the base module by the mechanical mating face, the distribution rail providing electrical connection between the base module and the one auxiliary module by engaging the electrical mating face to the electrical plug-in location.

2. The central electrical unit as claimed in claim 1, wherein, on its surface, said base module (1) has plug-in locations (3) for a relay and/or plug-in locations (4) for a fuse.

3. The central electrical unit as claimed in claim 1, wherein, on its surface, said one auxiliary module has a plug receptacle (9) for an electronic functional unit.

4. The central electrical unit as claimed in claim 1, wherein said one auxiliary module serves as a cable-harness plug.

5. The central electrical unit as claimed in claim 1, wherein said distribution rail (5) is fitted with supply voltage lines (21, 22).

6. The central electrical unit as claimed in claim 1, wherein a functional unit (3, 4, 11, 12, 13, 14, 15, 25) makes contact with at least the base module and one or two of the auxiliary modules, engaging around them.

7. The central electrical unit as claimed in claim 5, wherein the one auxiliary module has electrical means for making contact between the electrical, electronic and/or the electromechanical functional units (12, 13, 14, 15, 25) and said distribution rail (5).

8. The central electrical unit as claimed in claim 5, wherein, in addition to said supply voltage lines (21, 22), the distribution rail (5) has communication lines (23, 24) for networking individual components the central electrical unit with one another and with external devices.

9. The central electrical unit as claimed in claim 7, wherein the distribution rail (5) is in a form of a sheet-metal stamping.

10. The central electrical unit as claimed in claim 5, wherein the auxiliary modules are contactable on both sides of the distribution rail (5).

11. The central electrical unit as claimed in claim 5, wherein the distribution rail (5) overhangs the base module centrally, with the auxiliary modules being mechanically attached to the base module on both sides of the distribution rail (5), and with a harness (10) of the electrical cable being connectable between said auxiliary modules and various external electrical or electronic devices.

12. The central electrical unit as claimed in claim 5, wherein a second of the auxiliary modules is attached to a first of the auxiliary modules, and makes electrical contact with the distribution rail (5).

13. The central electrical unit as claimed in claim 5, further comprising a frame (29) for holding at least one of said auxiliary modules, wherein said frame is arranged on said base body (1) and encloses a portion of the distribution rail (5).

14. The central electrical unit as claimed in claim 13, wherein the base module and the frame (29) are formed integrally.

15. A modular central electrical unit comprising an electrically insulating base module having plug-in locations, which are formed on an outer wall of the base module, for receiving at least one of an electrical and an electromechanical functional unit, an electrical cable harness, a voltage distribution rail having electrical conductors thereon and extending outward from the base module, and at least one of a plurality of auxiliary modules, the plug-in locations being connected to one another and to at least one of the cable harness and an electronic functional unit; wherein each of the auxiliary modules comprises a housing of insulating material, the housing having a mechanical mating face and an electrical mating face, wherein one of the auxiliary modules is mechanically attached directly or via second of the auxiliary modules to the base module by the mechanical mating face, the distribution rail providing electrical connection between the base module and the one auxiliary module by engaging the electrical mating face to the electrical plug-in location.

16. The modular central electrical unit according to claim 15, wherein said distribution rail carries a supply-voltage.

17. A modular central electrical unit for motor vehicles, comprising:

a plurality of electrically insulated modules including a base module and at least one auxiliary module physically connected to one another, wherein an auxiliary module is mounted to the base module by being mechanically attached directly or via another of the auxiliary modules to the base module, each of the modules serving as an electrical and/or an electromechanical functional unit; and an electrical cable comprising a signal distribution rail with electrical conductors extending from the base module for making electrical connection between the base module and an auxiliary module mounted to the base module; wherein each of the auxiliary modules comprises a housing of insulating material, the housing having a mechanical mating face and an electrical mating face, wherein one of the auxiliary modules is mechanically attached directly or via second of the auxiliary modules to the base module by the mechanical mating face, the distribution rail providing electrical connection between the base module and the one auxiliary module by engaging the electrical mating face to the electrical plug-in location.

* * * * *